United States Patent
Brewer et al.

(10) Patent No.: US 8,381,934 B2
(45) Date of Patent: Feb. 26, 2013

(54) SEALING PLUG FOR BLIND INSTALLATION

(75) Inventors: Jonathan Brewer, Dunstable (GB); Julia Ahulu, Stevenage (GB)

(73) Assignee: Avdel UK Limited, Welwyn Garden City, Hertfordshire (GB)

(*) Notice: Subject to any disclaimer, the term of this patent is extended or adjusted under 35 U.S.C. 154(b) by 661 days.

(21) Appl. No.: 12/444,953

(22) PCT Filed: Oct. 11, 2007

(86) PCT No.: PCT/GB2007/003862
§ 371 (c)(1),
(2), (4) Date: Apr. 23, 2009

(87) PCT Pub. No.: WO2008/065327
PCT Pub. Date: Jun. 5, 2008

(65) Prior Publication Data
US 2010/0098510 A1    Apr. 22, 2010

(30) Foreign Application Priority Data
Nov. 28, 2006  (GB) .................................. 0623672.3

(51) Int. Cl.
*B65D 53/00* (2006.01)
*F16B 13/04* (2006.01)
*F16L 55/00* (2006.01)
(52) U.S. Cl. ............. 220/235; 220/234; 138/89; 411/34
(58) Field of Classification Search .................. 220/235, 220/234.378, 237; 215/358, 360; 138/89; 411/34, 338, 55, 500; 29/592
See application file for complete search history.

(56) References Cited

U.S. PATENT DOCUMENTS

| 2,466,013 | A | * | 4/1949 | Eaton | 411/34 |
| 3,175,455 | A | * | 3/1965 | Reddy | 411/53 |
| 4,310,273 | A | * | 1/1982 | Kirrish | 411/338 |
| 4,982,763 | A | | 1/1991 | Klahn | |
| 5,094,809 | A | | 3/1992 | Lenoble et al. | |
| 5,289,851 | A | * | 3/1994 | Jorgensen | 138/89 |
| 5,437,310 | A | | 8/1995 | Cunningham | |
| 6,893,196 | B2 | * | 5/2005 | Wille | 411/34 |

FOREIGN PATENT DOCUMENTS

| GB | 2351540 A | 3/2001 |
| WO | 85/04235 A1 | 9/1985 |
| WO | 03/036155 A1 | 5/2003 |

\* cited by examiner

*Primary Examiner* — Robin Hylton
(74) *Attorney, Agent, or Firm* — Hahn, Loeser & Parks LLP; Arland T. Stein

(57) ABSTRACT

The present invention provides a sealing plug for blind installation in a suitable hole (50) thereby to plug and seal the hole, which sealing plug comprises a sleeve (2), a nut stem (4) having a shoulder (8), and a head (6) at least part of which is radially enlarged with respect to the remainder of the stem; the nut stem being of a material which is harder than that of the sleeve; the nut stem being internally threaded; whereby, when the sealing plug is inserted in a suitable hole, with the sleeve entirely within the hole, and increasing force is applied to the stem with respect to the sleeve, axial compression is applied by the shoulder to the sleeve material abutting it, thereby causing the sleeve to deform and expand radially outwardly to engage with the wall (52) of the hole.

11 Claims, 5 Drawing Sheets

SEALING PLUG FOR BLIND INSTALLATION

CROSS-REFERENCE TO RELATED APPLICATION

This application is a National Phase filing regarding International Application No. PCT/GB2007/003862, filed on Oct. 11, 2007. International Application No. PCT/GB2007/003862 relies upon British Application No. 0623672.3, filed on Nov. 28, 2006 for priority.

BACKGROUND AND SUMMARY

This invention relates to a sealing plug for blind installation in a suitable hole thereby to plug and seal it, e.g. against high-pressure fluids. Blind installation means that the plug is installed by access through only one end of the hole.

Known types of sealing plugs (e.g. those available under the trademark AVSEAL II®) comprise a stem, passing through a hollow sleeve, the stem being provided with a radially enlarged head and a breakneck. The head abuts the sleeve and the stem, which extends outwards from the accessible side of the workpiece, is pulled, thus drawing the head into the sleeve, causing it to expand radially and thereby seal the aperture into which it has been inserted, until the stem breaks at the breakneck.

A disadvantage of this type of plug is that the portion of the stem which is broken off during installation, i.e. the portion beyond the breakneck, furthest from the radially enlarged head, is wasted, thus incurring disadvantages in terms of material cost and requirement for disposal means. The amount of wastage increases with an increase in the diameter of the plug, as the length of the stem must always be sufficient to allow an installation tool to gain sufficient purchase.

Another disadvantage is that as the plug diameter increases, so the breakneck strength increases. This in turn requires that the pulling jaws and housing of the tool used to install (place) the plug become more bulky, thus limiting the tool access in some applications. Shock loads, noise and re-coil of the stem within the sleeve also need special attention.

A further disadvantage of this type of plug is that whilst it is subjected to anti-corrosion treatment during manufacture, the subsequent breaking of the steel stem on installation of the plug exposes an area which is not corrosion resistant.

An object of the present invention is to provide a non-breakstem sealing plug which overcomes the aforementioned problems.

Accordingly, the present invention provides, in a first aspect, a sealing plug for blind installation in a suitable hole thereby to plug and seal the hole, which sealing plug comprises:
a sleeve,
a nut stem having a shoulder, and a head at least part of which is radially enlarged with respect to the remainder of the stem;
the nut stem being of a material which is harder than that of the sleeve;
the nut stem being internally threaded;
whereby, when the sealing plug is inserted in a suitable hole, with the sleeve entirely within the hole, and increasing force is applied to the stem with respect to the sleeve, axial compression is applied by the shoulder to the sleeve material abutting it, thereby causing the sleeve to deform and expand radially outwardly to engage with the wall of the hole.

An advantage of the present invention is that no material is discarded, thus providing a cost saving over currently known sealing plugs.

Another advantage of the present invention is that the nut stem is entirely corrosion resistant due to the absence of breaking during installation causing a non-corrosion coated surface to become exposed.

The sealing plug preferably includes at least one annular groove provided in the nut stem, into which sleeve material can enter during installation of the plug into a hole. An advantage of the sleeve material entering the grooves is that positive locking between the sleeve and the nut stem is achieved, and the potential for leakage between the nut stem and the sleeve after installation of the plug is reduced, thus improving the efficiency of the plug.

Preferably at least two annular grooves are provided. This is advantageous during manufacture of the nut stem, as a blank nut stem which is having only one groove rolled into it may twist in the machine; rolling at least two grooves will prevent such twisting.

The annular grooves are advantageously asymmetric in profile. An asymmetric groove profile facilitates flow of sleeve material into the groove during installation of the plug, and improves locking between the sleeve and the nut stem once the plug is installed.

The radially enlarged head may be provided with a tapered underside shoulder. This provides the advantage of facilitating the flow of the sleeve material into the first annular groove, i.e. the groove closest to the head, on installation of the plug.

Preferably the radially enlarged head is manufactured by cold heading and is provided with a drive recess, which acts to resist roll-tapping torque during subsequent manufacture of the nut stem.

The invention provides methods of installing a plug into a hole comprising steps of inserting the sealing plug into the hole and applying an increasing force to the nut stem with respect to the sleeve, until in a second aspect the force has reached a predetermined level and in a third aspect the nut stem has been displaced by a predetermined value.

If the installation tool is set to apply an increasing force to the nut stem with respect to the sleeve until a predetermined level of force has been reached, flexibility in the hardness of the nut stem material is possible, without affecting the efficiency of the plug.

Alternatively, if the installation tool is set to apply an increasing force until a set tool stroke, the nut stem will accordingly be displaced by a predetermined amount, which is advantageous if the position of the installed plug is important, e.g. if the nut stem is required to be below, or flush with, the surface of the workpiece. The same plug design suits either of these placing techniques.

The present invention provides, in a further aspect, a method of manufacturing a sealing plug comprising steps of thread-rolling annular grooves onto a nut stem, producing an internal thread in the nut stem, providing a corrosion resistant plating to the nut stem, and crimping a sleeve of a material having a hardness lower than that of the nut stem onto the nut stem.

BRIEF DESCRIPTION OF THE DRAWINGS

A specific embodiment of the invention will now be described by way of example and with reference to the accompanying drawings, in which.

DETAIL DESCRIPTION OF THE DRAWINGS

Figure 1:
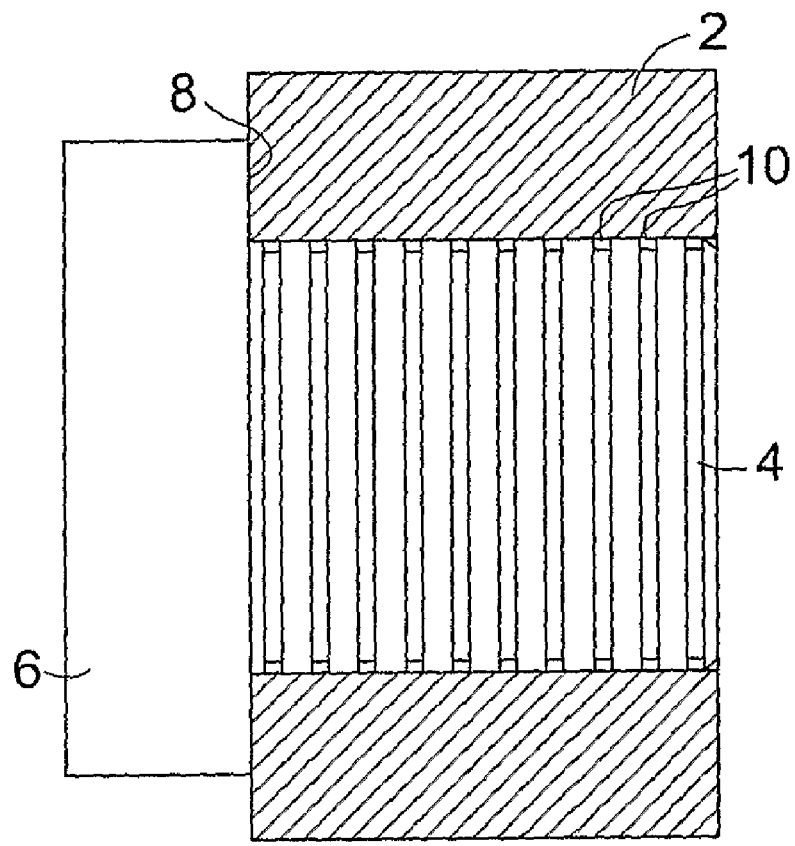
FIG. 1 is an elevation of a nut stem in a cross-sectional sleeve in accordance with the invention.
Figure 1A:
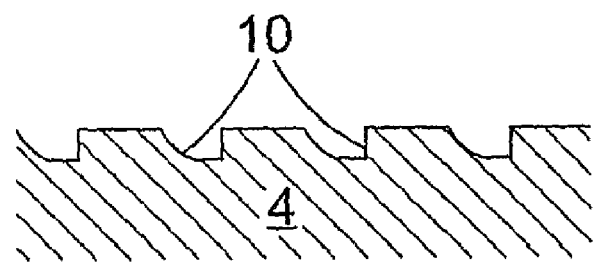
FIG. 1A is a partial cross-section of the nut stem of FIG. 1.
Figure 3:
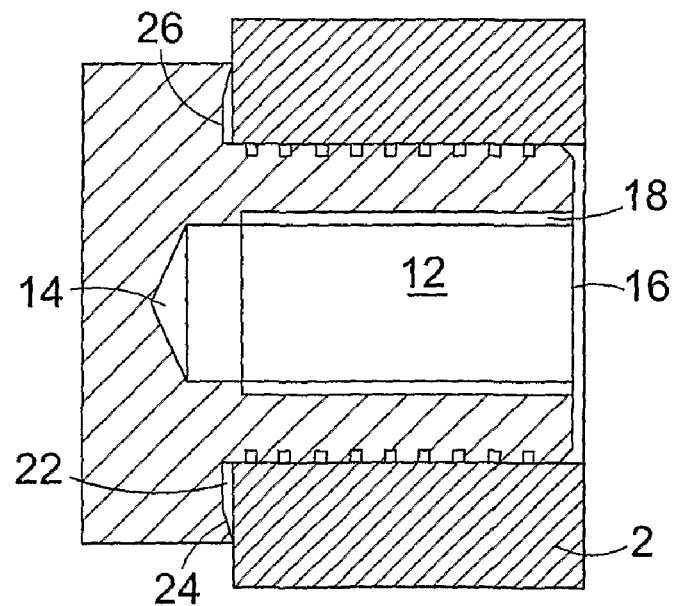
FIG. 3 is a cross-section of the plug of FIG. 1.

Referring to FIG. 1, the plug comprises an aluminium sleeve 2 and a nut stem 4. The nut stem 4 is provided with annular grooves 10 and a radially enlarged head 6, the shoulder 8 of which abuts against sleeve 2. As illustrated in FIG. 3, shoulder 8 of head 6 is provided with a recess 22 which is defined by a tapered wall 24 extending from the radially outermost point of the head 6 to a flat wall 26.

As illustrated in FIGS. 3 to 6, the nut stem 4 has a hollow core 12 and is provided with an internal thread 18. The core 12 extends partially into the head 6 and ends in cone-shaped section 14. The internal thread 18 extends through the core 12 from the open end 16 of the nut stem 4.

The sleeve is manufactured from relatively soft material such as aluminium and the nut stem 4 is made from a relatively hard material such as as-headed or heat-treated steel, and is provided with a corrosion resistant plated finish.

Figure 7:
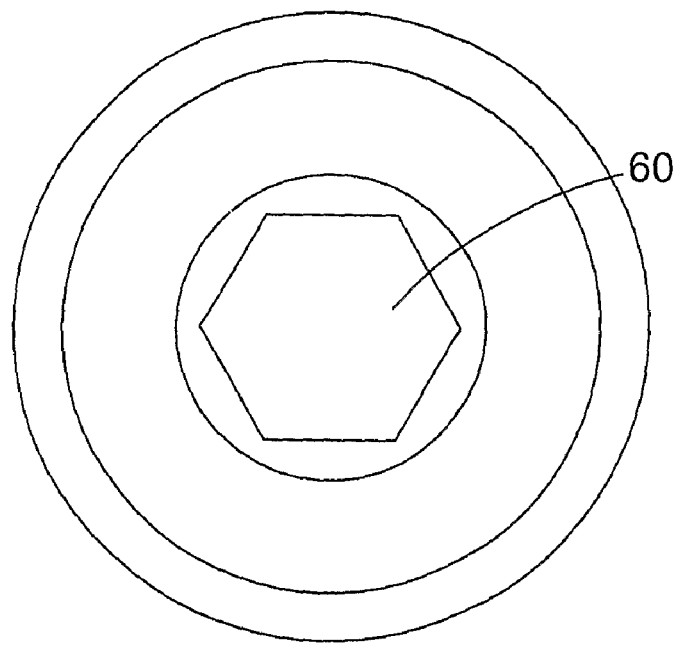
FIG. 7 is a plan view of an alternative nut stem in accordance with the invention.
Figure 8:
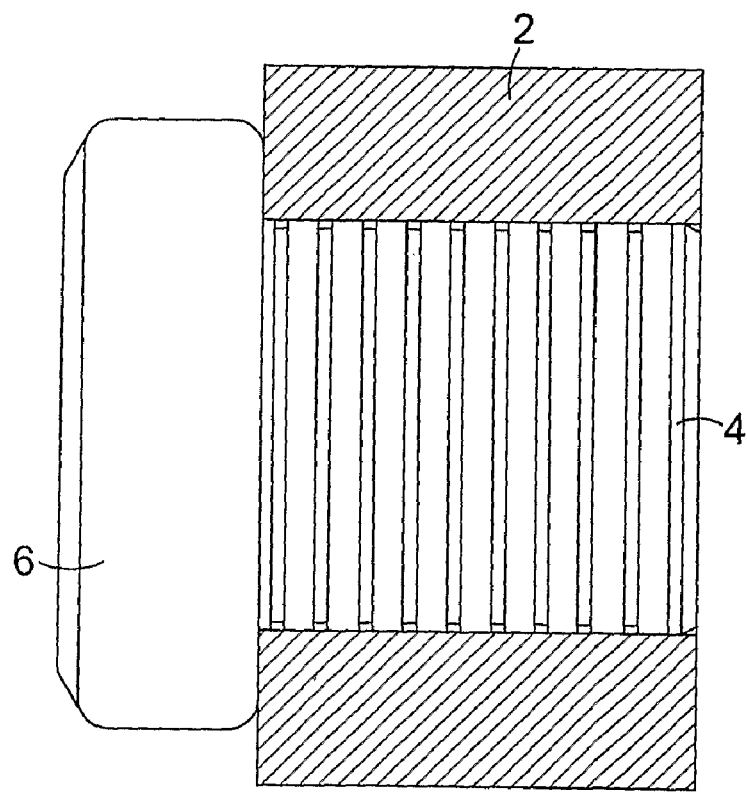
FIG. 8 is an elevation of an the nut stem of FIG. 7 with a cross sectional sleeve.

The annular grooves 10 are thread-rolled onto a blank nut-stem. In the embodiments of FIGS. 7 and 8, a drive recess 60 is provided in the thicker head 6 to enable the nut stem 4 to be held against rotation to resist roll-tapping torque.

The sleeve 4 is pushed into nut stem 4 in an interference fit, and possibly subsequently crimped onto the nut stem 4 by a tapered crimp applied to the sleeve end adjacent the stem head 6.

Figure 4:
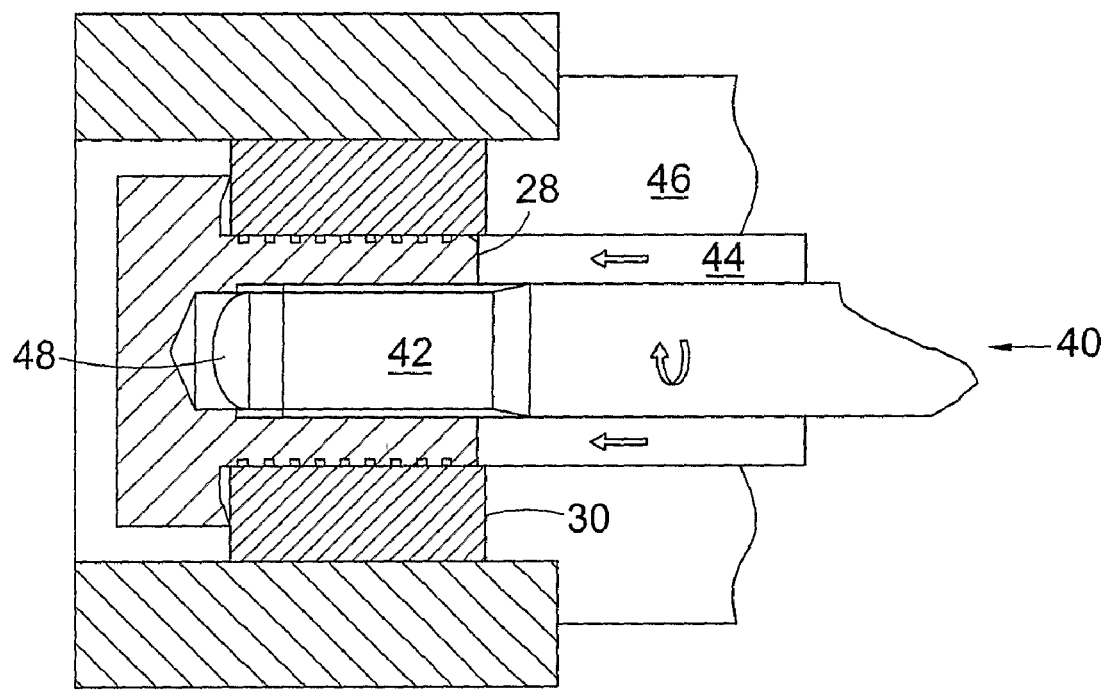
FIG. 4 is a cross-section of the plug of FIG. 1 and an installation tool.
Figure 5:
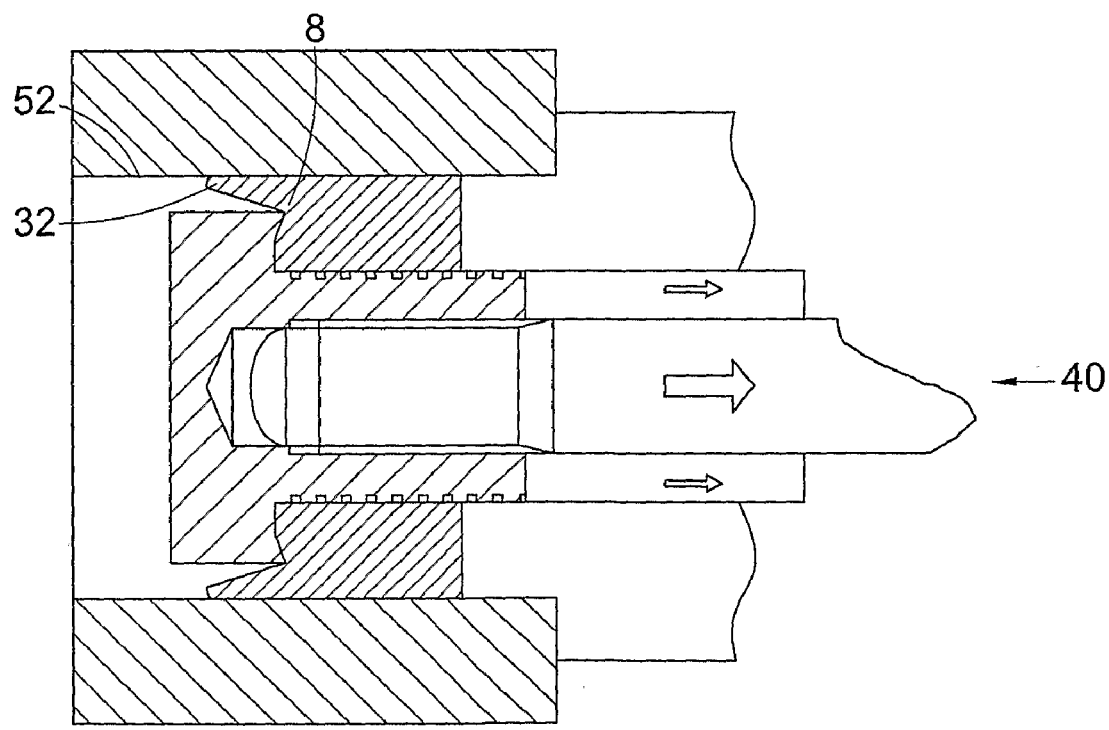
FIGS. 5 and 6 are cross-sections of successive stages of the installation of the plug of FIG. 1.
Figure 6:
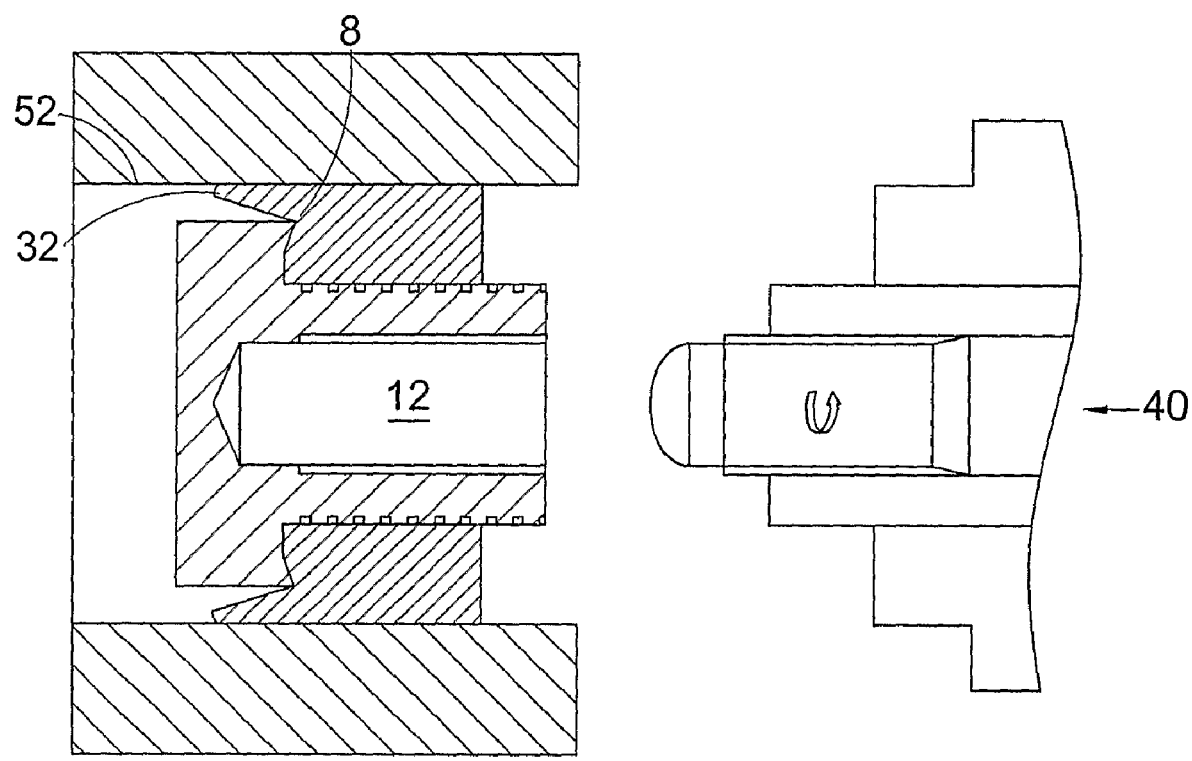

As illustrated in FIGS. 4 to 6, a tool, indicated generally at 40 is used to install the plug in an aperture 50. The tool comprises a threaded drivescrew 42 with pilot point 48, surrounded by a sprung loaded sleeve 44 and a nose tip 46 which surrounds the sleeve 44.

The installation process involves fitting the plug onto the tool, inserting the plug into the aperture 50, activating the tool to place the plug, then removing the tool from the plug. This process is described in detail below.

As illustrated in FIGS. 4 to 6, the threaded drivescrew 42 of tool 40 is screwed into the thread 18 of the nut stem 4. The sleeve 44 of the tool 40 is arranged to abut against a surface 28 of the nut stem 4 via a light spring force, and the nose tip 46 abuts against a surface 30 of the sleeve 2.

Figure 2:
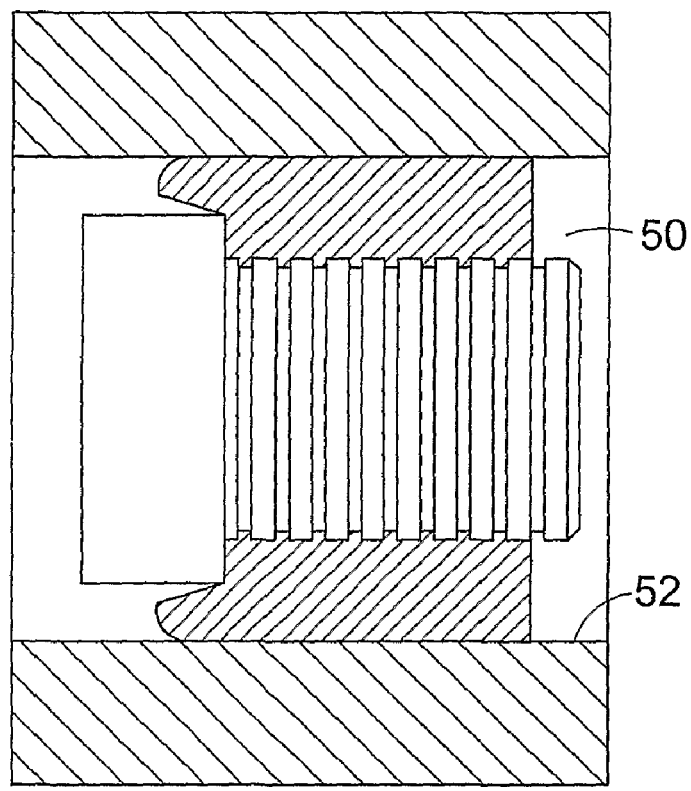
FIG. 2 is an elevation of the plug of FIG. 1, with a cross-sectional sleeve, installed in an cross-sectional aperture of a workpiece.

To install the plug, it is inserted into the aperture 50 to be plugged, as shown in FIG. 2, to a position where nosetip 46 abuts the workpiece outer face 54.

When the tool 40 is activated, the drivescrew 42 and sleeve 44 are pulled in a direction X as shown on FIG. 5, i.e. in a direction axially away from the aperture 50. The pulling force is transmitted to nut stem 4 via the internal thread 18 in the core 12, causing the nut stem 4 also to be pulled in direction X. Therefore the force is further transmitted to the sleeve 2 via the shoulder 8 of the head 4 of the nut stem 2.

As the drivescrew 42 and sleeve 44 of the tool 40 are pulled, the nose tip 46 remains static, thus preventing the adjacent end of sleeve 2 from moving in direction X. Therefore the material of the sleeve 2 is forced radially outwardly to engage with the wall 52 of plug aperture 50, and radially inwardly into the annular grooves 10 of nut stem 4. FIGS. 2, 5 and 6 illustrate the annular grooves 10 filled with material of sleeve 2. The curved section 11 of the profile of the annular grooves 10 facilitates flow of material into the grooves. The flow of material into the first annular groove, i.e. the groove closest to the head 6, is also facilitated by the tapered wall 24 on the shoulder 8 of the head 6.

Material of sleeve 2 is also forced to flow between the wall 52 of the aperture 50 and the head 6 of the nut stem 4. This is illustrated at region 32 in FIG. 5.

The tool 40 is operated to pull drivescrew 42 either to a set tool stroke length, i.e. a set displacement of the nut stem and/or sleeve material, or to a pre-set load.

Once the plug has been installed, the drivescrew 42 is removed by unscrewing from the thread 18.

A cap could be provided if necessary to cover the opening of core 12 in the installed plug.

An asymmetric annular groove profile other than that described above could be used. For example, the grooves could have an asymmetric triangular or part-elliptical profile.

The nut stem may alternative be headed or turned from stainless steel.

A range of sizes of plugs may be used depending on the size of the hole to be plugged. A short plug may be used if the amount of displacement of the nut stem and/or sleeve material is important, for example if it is required to be at least flush with the workpiece surface. The length of the plug need only be sufficient to provide sufficient threading of the tool drivescrew into the nut stem core.

The internal thread of the nut stem could be a fine pitch thread or a non-standard diameter to prevent the plug being used as a fixing point in service.

Stresses in the tool drivescrew during installation of the plug may be reduced by using a fine pitch thread and particular thread profiles with larger root radii.

Placing the plug to a lower controlled force can control plug radial expansion pressure within the hole. This would be advantageous in applications in which installation stresses of prior art plugs have been known to cause cracking of the workpiece.

The installation tool could include a sprung sleeve 44 to assist in guiding the drivescrew and preventing material of sleeve 2 from flowing radially inwards between the sleeve 44 and the nut stem 4 as the latter is pulled back.

An alternative embodiment (not shown) may not include a hollow core and internal thread, and may instead be provided with external pulling means such as a male threaded stem, an annular grooved stem, or another protruding feature upon which a placing tool can be engaged and subsequently removed.

The invention claimed is:

1. A non-breakstem sealing plug for blind installation in a suitable hole thereby to plug and seal the hole, which sealing plug comprises:
    a sleeve,
    a nut stem retained in the sleeve by an interference fit,
    wherein the nut stem has:
        a shoulder configured to axially abut an end portion of the sleeve,
        a head at least part of which is radially enlarged with respect to a remainder of the stem, and
        a hollow core extending from an open end of the nut stem opposite the head through at least a portion of the remainder of the nut stem,
    wherein the hollow core is internally threaded, and wherein the nut stem comprises a material which is harder than that of the sleeve;

wherein the sealing plug is insertable in a suitable hole, with the sleeve entirely within the hole, and the sleeve is expandable by axial compression applied by the shoulder to the sleeve material abutting it, thereby causing the sleeve to deform and expand radially outwardly to engage with a wall of the hole.

2. A non-breakstem sealing plug as claimed in claim 1 wherein the nut stem is provided with at least one annular groove whereby axial compression applied to the shoulder additionally causes the sleeve to deform radially inwardly to enter the at least one annular groove.

3. A non-breakstem sealing plug as claimed in claim 2 wherein the at least one annular groove has an asymmetric profile.

4. A non-breakstem sealing plug as claimed in claim 1 wherein the radially enlarged head has a tapered underside shoulder.

5. A non-breakstem sealing plug as claimed in claim 1 wherein the radially enlarged head is provided with a drive recess.

6. A method of installation of a non-breakstem sealing plug into a suitable hole, which sealing plug comprises:
   a sleeve,
   a nut stem retained in the sleeve by an interference fit, wherein the nut stem has:
      a shoulder configured to axially abut an end portion of the sleeve,
      a head at least part of which is radially enlarged with respect to a remainder of the stem, and
      a hollow core extending from an open end of the nut stem opposite the head through at least a portion of the remainder of the nut stem,
   wherein the hollow core is internally threaded,
   wherein the nut stem comprises a material which is harder than that of the sleeve; and
   wherein the sealing plug is insertable in a suitable hole, with the sleeve entirely within the hole, and the sleeve is expandable by axial compression applied by the shoulder to the sleeve material abutting it, thereby causing the sleeve to deform and expand radially outwardly to engage with a wall of the hole;
   which method comprises steps of inserting the sealing plug into the hole and applying an increasing force, via the internal thread, to the nut stem with respect to the sleeve until the force has reached a predetermined level.

7. A method of installation of a non-breakstem sealing plug into a suitable hole, which sealing plug comprises:
   a sleeve;
   a nut stem retained in the sleeve by an interference fit, wherein the nut stem has:
      a shoulder configured to axially abut an end portion of the sleeve,
      a head at least part of which is radially enlarged with respect to a remainder of the stem, and
      a hollow core extending from an open end of the nut stem opposite the head through at least a portion of the remainder of the nut stem,
   wherein the hollow core is internally threaded, and
   wherein the nut stem comprises a material which is harder than that of the sleeve;
   wherein the sealing plug is insertable in a suitable hole, with the sleeve entirely within the hole, and the sleeve is expandable by axial compression applied by the shoulder to the sleeve material abutting it, thereby causing the sleeve to deform and expand radially outwardly to engage with a wall of the hole;
   which method comprises steps of inserting the sealing plug into the hole and applying an increasing force, via the internal thread, to the nut stem with respect to the sleeve until the nut stem has been displaced by a predetermined value.

8. A non-breakstem sealing plug for blind installation in a suitable hole thereby to plug and seal the hole, which sealing plug comprises:
   a sleeve having an inner diameter and an outer diameter;
   a nut stem having a shoulder, and a head at least part of which is radially enlarged with respect to a remainder of the nut stem, and wherein the head has a diameter greater than the inner diameter of the sleeve and less than the outer diameter of the sleeve;
   the nut stem being of a material which is harder than that of the sleeve;
   the nut stem having an externally threaded portion opposite the head, wherein the externally threaded portion protrudes from one end of the sleeve; and
   wherein the nut stem is provided with at least one annular groove whereby axial compression applied to the shoulder causes the sleeve to deform radially inwardly to enter the at least one annular groove;
   wherein the sealing plug is insertable into a suitable hole, with the sleeve entirely within the hole, and the sleeve is expandable by axial compression applied by the shoulder to the sleeve materially abutting it when an axial force is applied to the externally threaded portion of the stem, thereby causing the sleeve to deform and expand radially outwardly to engage with a wall of the hole.

9. A non-breakstem sealing plug as claimed in claim 8 wherein the at least one annular groove has an asymmetric profile.

10. A non-breakstem sealing plug as claimed in claim 8 wherein the radially enlarged head has a tapered underside shoulder.

11. A non-breakstem sealing plug as claimed in claim 8 wherein the radially enlarged head is provided with a drive recess.

* * * * *